United States Patent [19]

Crosbie

[11] Patent Number: 4,687,606

[45] Date of Patent: Aug. 18, 1987

[54] METALLOID PRECURSOR POWDER AND METHOD OF MAKING SAME

[75] Inventor: Gary M. Crosbie, Dearborn, Mich.

[73] Assignee: Ford Motor Company, Dearborn, Mich.

[21] Appl. No.: 660,759

[22] Filed: Oct. 15, 1984

[51] Int. Cl.$^4$ ............................................. B22D 23/08
[52] U.S. Cl. ......................................... 264/8; 264/15; 264/28; 420/556; 420/578; 425/8
[58] Field of Search .......................... 264/8, 15, 28; 75/0.5 C, 0.5 B, 0.5 BC; 420/578, 556; 425/8

[56] References Cited

U.S. PATENT DOCUMENTS

| | | | |
|---|---|---|---|
| 3,364,015 | 1/1968 | Sump | 420/578 |
| 3,854,940 | 12/1974 | Hoekje | 420/578 |
| 4,078,873 | 3/1978 | Holiday et al. | 264/8 X |
| 4,193,974 | 3/1980 | Kotval et al. | 423/348 |
| 4,193,975 | 3/1980 | Kotval et al. | 423/348 |
| 4,195,067 | 3/1980 | Kotval et al. | 423/348 |
| 4,221,587 | 9/1980 | Ray | 75/0.5 C |
| 4,355,057 | 10/1982 | Slaughter | 264/8 X |
| 4,379,777 | 4/1983 | Boulos | 423/348 |
| 4,386,896 | 6/1983 | Ray | 425/7 |
| 4,402,905 | 9/1983 | Burke et al. | 420/578 X |
| 4,419,060 | 12/1983 | Speier et al. | 264/8 X |

*Primary Examiner*—Robert Yoncoskie
*Attorney, Agent, or Firm*—Joseph W. Malleck; Leonard Tachner

[57] ABSTRACT

A method of making a metalloid precursor powder is disclosed, which powder avoids impurity localization and is effective to produce an improved fine grained ceramic body. A metalloid melt is formed and rapidly solidified into particles having a particle size distribution of 2-50 microns; the particles are cooled at a rate to distribute impurities or additive metal ingredients substantially uniformly throughout the solidifed particles with spacing between localizations being substantially in the range of 1-25 microns and the size of each localization being one micron or less. The cooling rate is preferably equal to or greater than $10^5$° C./second.

8 Claims, 1 Drawing Figure

METALLOID PRECURSOR POWDER AND METHOD OF MAKING SAME

TECHNICAL FIELD

This invention relates to the art of making ceramics by use of precursor powders and more particularly to the art of making metalloid precursor powders useful in the making of silicon nitride and silicon nitride base compositions.

BACKGROUND OF INVENTION AND PRIOR ART STATEMENT

Metalloid precursor powders are useful in the making of ceramics. One such powder is a silicon powder which can be subjected to gas nitriding to form silicon nitride under proper heating conditions. Precursor powders have been made heretofore conventionally by casting an ingot of the precursor such as molten silicon, which ingot is subsequently crushed and ground to a powder condition. The molten liquid of which the ingot is cast contains residual impurities. These impurities, when localized as large, second phase particles, create flaws in the final ceramic which weaken the physical characteristics thereof. Coarse impurity localization is unavoidable in ingot-cast silicon; the second phases, such as iron silicide and aluminum in silicon, form at the grain boundries of the cast metalloid in localizations (second phase particles) that are sufficiently large in size that they can be seen with the unaided eye (50-200 micrometers and larger). Subsequent crushing and milling easily breaks down the matrix metalloid, but the intermetallic compounds, by virtue of being slightly malleable, can and do remain large. Air classification can, in principle, eliminate many of the largest localizations of impurities, but impurity localizations comparable to and larger than metalloid weight mean particle size (2-8 microns) can remain. Differences in ingot-casting technique (such as rotating the mold slowly versus stationary) and milling techniques (such as dry ball milling versus jet milling) produce only minor effects in the sense that impurity localizations that are established at the time of solidification tend to be difficult to remove.

This invention has found rapid cooling an important process adjunct to economically reducing in size or eliminating impurity localizations. Extremely fast cooling of liquid metals which could be useful as precursor elements has been studied in the last 20 years for a variety of objectives. A summary of glassy metal powder atomization is recited in U.S. Pat. No. 4,221,587. Similarly, fast casting of iron/silicon/boron alloys has been carried out (U.S. Pat. No. 4,386,896) to provide a transformer core material having improved property in the form of lower magnetic core loss. Each of these techniques do use fast cooling (not necessarily rapid cooling), but have incorporated metalloids only in minor amounts and only to produce glassy metals which have no crystalline peaks when examined by X-ray diffraction. Therefore, such patent teachings do not encounter the problem of concern here, namely, making a crystalline precursor powder for ceramics without localizations of intergranular second phases or impurities which can create flaws in the crystalline ceramic.

One attempt to use rapid solidification on metalloids used in a major amount is demonstrated in U.S. Pat. No. 4,347,199 (and related U.S. Pat. No. 4,419,060), wherein a high thermal transfer gas or fluid is used to cool droplets atomized by a rotating disc. Such technique has been developed solely with the aim of providing coarse and spherical powder particles which could subsequently be used in the making of silicone polymers. Such techniques did not encounter or appreciate the problem of impurity localization and therefore did not require the use of cooling which was sufficiently fast to avoid such local concentrations.

It is important to point out that slow rates of cooling promote impurity concentrations, and extremely slow rates of cooling are the basis of purification and zone refining techniques of silicon and a source of dendritic segregation and compositional coring in ingot-cast superalloys. Each of these results must be avoided if the precursor powder is to provide delocalization, that is, more uniform distribution of impurities or second phase additives. Use of segregation to produce purification of silicon has been described by Boulos in U.S. Pat. No. 4,379,777. The silicon is heated in a plasma and quenched. Upon solidification of the molten particles, a portion of the impurities migrates to the surface of the granules obtained. By iterative combination with leaching of surface segregated impurities, silicon of high purity is obtained. Segregation is also used in a related manner by the addition of aluminum metal in U.S. Pat. Nos. 4,193,974; 4,193,975; and 4,195,067, all assigned to the Union Carbide Corporation. Directional solidification of the molten material is achieved at a rate of 60° C. per hour to achieve separate regions of solidified melt having high impurity concentration and another region having low impurity concentration.

SUMMARY OF INVENTION

The invention is a method of making a metalloid precursor powder effective to produce a ceramic body having a particularly fine grained impurity phase. The precursor powder has improved chemical uniformity which is significant in the making of a ceramic with greater physical reliability and at lower cost.

The method herein of making a metalloid precursor powder comprises the steps of: (a) melting a selected metalloid to form a liquid, and (b) extracting portions of the liquid in a manner to rapidly solidify the extracted portions at a rate to distribute impurity or other additive ingredient localizations substantially uniformly throughout the solidified particles with spacing between localizations being substantially in the range of 1-25 microns and the size of said localizations being on average one micron or less. In the preferred embodiment, the size of each such localization is one micron or less. Preferably said cooling rate is equal to or greater than $10^5$° C./second and extraction is carried out by comminuting the liquid into particles which are rapidly solidified. Advantageously, the metalloid is germanium or silicon.

The invention additionally comprehends a method of making a metalloid precursor powder which contains second phase oxynitride forming additive metals, the method comprises the steps of (a) dissolving second phase forming additive metals into a molten body of a selected metalloid to form a solution, (b) rapidly solidifying said solution as comminuted droplets to form particles, said particles having a size distribution of 2-50 microns, and said solidification being carried out at a rate effective to distribute the impurities and additive metal localizations substantially uniformly throughout the particles with spacing between the localizations being substantially in the range of 1–25 microns; and (c) oxidizing the additive metals in said particles.

Preferably, the second phase forming additive metals comprise yttrium or aluminum in combination with yttrium. The oxidizing step is best carried out by internal oxidation through means of a controlled atmosphere anneal so that the additive metals such as yttrium (2–15% by weight) and yttrium combination with aluminum (Al:0–1.3% by weight) form $Y_2O_3$ and $Al_2O_3$. The localizations are advantageously limited in size to one micron or less.

Preferably, the rapid solidification may be carried out by use of a rotating disc which comminutes a stream of the molten metalloid and additives and then subjects the comminuted droplets to a high heat exchange fluid, such as helium. The resulting powder will have a particle size distribution of 5–90 microns, a shape characterized as irregular spheroid.

BEST MODE FOR CARRYING OUT INVENTION

Figure 1:
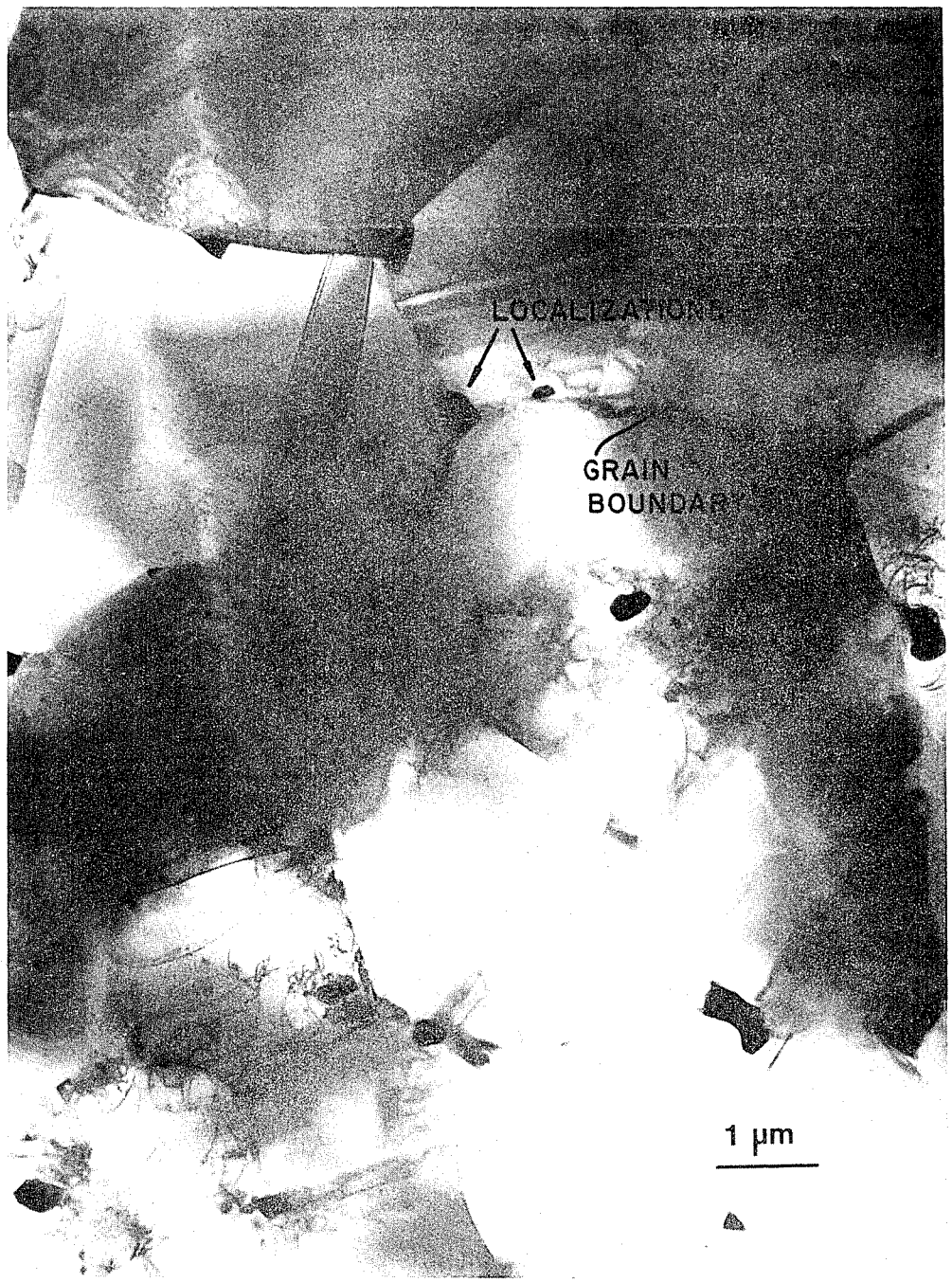
FIG. 1 is a schematic illustration of the microstructure resulting from the carrying out of rapid solidification of the molten metalloid (metallurgical grade silicon) in accordance with this invention.

Relation Between Cooling Rate and Impurity Localization

This invention avoids large impurity or additive metal localizations in the chemistry of the resultant precursor powder by essentially moving the boundary between the solid and liquid phases in a partially solidified droplet of the metalloid precursor faster than the impurities or metal additives can diffuse away into the liquid. More particularly, this invention provides a method by which an improved metalloid precursor powder can be made specifically for subsequent reaction bonding of powders, such as silicon, to make silicon nitride. Metalloid is here used to refer to the grouping of germanium, silicon, phosphorus, boron and antimony, all of which can be liquified readily in the temperature zone of 1200°–1800° C. Silicon and germanium are of particular interest herein.

In the reaction bonding of silicon to make silicon nitride it has been found, through other developments, that the presence of certain oxynitrides is important to the subsequent processing of the nitrided product. If such oxynitrides are to be formed as a result of the nitriding operation, then ingredients for forming the oxynitrides must be treated similarly as impurities and prevented from being localized in concentration to obtain a much finer grain size and uniformity of chemistry throughout the precursor powder. For the making of silicon nitride with oxynitrides, the additive metals to silicon powder, such as yttrium and aluminum, must be disseminated substantially on a submicron scale. This dissemination can be brought about by insuring that the solid liquid boundary during solidification of silicon moves so quickly that the impurities or additive metals are entrained in the solid phase with localizations substantially only submicron in size. Too slow a rate of solidification would permit the impurities or additive metals to concentrate in the liquid phase and therefore be present in rich amounts in large localizations. Localization is used herein to mean a unitary agglomeration or deposit of the impurity or additive metal, which deposit will occur at the intergranular grain boundary of the silicon. It should be remembered that slow rates of solidification are the basis of purification in zone refining of silicon and are the source of dendritic segregation and coring in ingot-cast superalloys. It is demonstrated in the examples of this invention that the reverse of zone refining has taken place in that the impurities or alloying elements are entrained in the solid (with localizations substantially only micron in size) as solidification proceeds. Particle size, as used herein, means the largest transverse dimension of a particle which is either the partially solidified droplet or the fully solidified particle. Particle size distribution is the range in size of particles as atomized or comminuted. The size distribution of particles, as fully solidified, does not vary considerably from that as atomized or comminuted.

It has been found, in accordance with this invention, that the precursor metal in its molten state must be rapidly solidified at a rate equal to or faster than $10^{5°}$ C./second and, preferably, in the range of $2–10\times10^{6°}$ C./second for silicon. To achieve this extremely rapid rate of solidification, in conjunction with the breaking up of the molten metal into fine droplets or particles, several mechanical techniques may be employed, including disc atomization, melt extraction, and ultrasonic atomization. In all of these cases, the molten metalloid liquid is broken up into droplets or particles. In the case of disc atomization, such droplets are formed from a thin sheet of the metalloid liquid which separates into ligaments and then the ligaments form unstable columns to become droplets. The diameter of the resulting droplets is correlated with surface tension, viscosity and density of the metalloid liquid. Such metalloid liquid parameters do vary, but for silicon the surface tension is in the range of 825–860 dyne/cm, the viscosity is about 0.4 cP, and the density is about 3.2 gm/cm³. Remarkably, the viscosity of molten silicon metalloid is less than that of water.

Disc Atomization

For purposes of the preferred embodiment herein, disc atomization is employed which provides a very high rate of cooling by passing fine droplets at high relative velocities through a gas with a high thermal conductivity and heat capacity, such as helium. The equipment to carry out such rapid solidification by disc atomization is described in U.S. Pat. No. 4,078,873, incorporated herein by reference. The metalloid (silicon) is induction melted in a vacuum furnace contained in a vacuum tank; alloying ingredients, such as yttrium and aluminum, are added to the metalloid in the furnace in predetermined amounts. The metalloid liquid is poured into a tundish and allowed to flow through a metered orifice in the bottom of the tundish and onto a rapidly spinning copper disc. A turbine, which is water cooled, drives the disc in a rotary manner. A horizontal spray of the metalloid material is cooled by high velocity helium jetting from above in a direction downwardly and at right angles to the horizontal spray of the metalloid liquid. Coarse solidified particles of silicon alloyed with the additive metals are collected at the bottom of the chamber surrounding the atomizing process; some fine particles are carried out of the duct with the helium gas to a cyclone separator and collected.

Typically, for a three inch diameter disc (7.6 cm), rotating at 24,000 rpm, with a tip speed of 96 meter per second, and having the helium gas jetting against the sprayed metalloid at a mass flow rate of about 0.91 kilograms per second at a temperature of about 80° C., and a velocity of about Mack 0.7, and having the silicon withdrawn from the tundish at a flow rate of about 0.065 kilograms per second, an estimated cooling rate of about $1.6 \times 10^{6°}$ C./second can be achieved. With this cooling rate, impurity localization is extremely finely disbursed, the collection of particles are of an estimated size having 50% of the particles (average particle size) less than 40 micrometers.

Rotational speed and flow rate of the metal from the tundish onto the rotating disc has some effect upon the droplet size of the metalloid liquid. For example, if the rotational speed is varied from 12,000 to 64,000 rpm, the liquid silicon metalloid will have an estimated average droplet size varying from 92 down to 23 microns. When the flow rate emanating from the tundish is varied from 10 to 40 milliliters per second, the silicon average particle size will vary from 44 to 61 microns in the calculation. In this manner, the average particle diameter for 50% or more of the solidified particles can be estimated and controlled.

Cooling Rate

With the desired particle size projected, calculation of the heat transfer coefficient can be made which in turn facilitates determination of the cooling or solidification rate. The heat transfer coefficient will be at a linear relationship with the temperature difference between the gas and the droplets multiplied by the surface area of the droplet and the heat transfer rate. The principal heat transfer is by conduction, not radiation. Three dimensionless quantities are used in the determination of cooling rate, including the Reynolds, Prandtl and Nusselt numbers. The Nusselt numbers determine from an empirical fit of exponents of the Reynolds and Prandtl numbers.

The heat transfer rate divided by the heat capacity per droplet yields the cooling rate. The cooling rate information is important because it tells us at what rate the solid liquid phase boundary velocity is moving; this can be compared against the diffusion rate of the impurities. The solid liquid phase boundary velocity can be estimated by balancing the heat transfer to the gas with the latent heat of solidification. An average velocity is approximated for the spherical boundary which equals 0.79 times the particle radius. The velocity like the solid liquid phase boundary velocity for silicon is about 1.18 cm/second and is usually in the range between 1-1.5 cm/second. The impurity diffusivity can be calculated for time periods similar to those for complete solidification of the particle. An experimental value for an impurity diffusion of germanium and silicon has been reported by other authors at 1430° C. to be about $6.6 \times 10^5$ cm$^2$/second.

Method

A preferred method for carrying out the invention is as follows: (1) A metalloid metal is melted and homogenized, in which may be dissolved certain second phase forming additive metals in the molten state of the metalloid to form a solution. (2) With or without the intentional dissolution of the additive ingredients, the liquid metalloid is rapidly solidified at a rate effective to not only atomize the liquid metalloid into particles having a size distribution of 2-50 microns, but also to distribute the native impurity and/or additive metal localizations uniformly throughout the particles with spacing between the localizations being substantially in the range of 1-25 microns and the size of each localization being one micron or less. (3) If the additive metals are present in the solidified particles, the particles are then oxidized to present the resulting particles as a mixture of silicon and second phase oxides.

The additive metal is preferably selected from the group consisting of yttrium and aluminum, each of which additive metals are particularly suitable for making a silicon precursor powder useful in being nitrided to silicon nitride having particular second phase crystallites, highly desirable for subsequent hot pressing and sintering techniques. The additive metals are added in amounts of 2-15% by weight for yttrium and up to 1.3% by weight for aluminum. The metalloid is preferably silicon or germanium. Rapid solidification is carried out at a rate which, for silicon, is equal to or in excess of $10^{5°}$ C./second, and the oxidation of the solidified particles is preferably carried out by internal oxidation under a controlled atmosphere anneal.

EXAMPLE 1

In this example, the achievement of a fine dispersion of silicide particles is demonstrated for metallurgical grade silicon without intentional additive metals. These impurities are present as minor constituents (that is, typically less than 1.5% by weight) as a residue of the refining process. Ingot-cast metallurgical grade silicon was provided by the Globe Metallurgical Division of Interlake, Inc., with a chemical composition of 0.33% Fe, 0.021% Ca, 0.18% Al, and 0.014% Mn. The form of this material was ½ inch chunks broken from ingots. The silicon chunks were placed in an SiO$_2$ crucible and heated above the melting point of silicon. A rotating disc was dipped into the surface of the melt to extract a rapidly solidified ribbon of particles of approximately 25 micrometer thickness and 1-2 mm width. The rate of solidification was in the range of $2 \times 10^{5°}$ C./second.

In order to observe the impurity phase distribution, particles of the ribbon so produced were prepared for electron microscopy by ion bombardment etching. Examination in a Siemens 102 transmission electron microscope showed the silicide particle localizations to be of average dimension no greater than 0.2 micrometer. FIG. 1 is a graphical illustration of the particle localizations so observed. The dark areas represent regions of greater opacity to the electron beam corresponding to regions of higher atomic number. These second phase particles are identified to be the transition metal silicides, such as iron silicide and manganese silicide, and are shown to be substantially uniformly distributed.

In addition to refinement of the second phase particle size, the grain size was also reduced in size as compared to ingot cast materials. The expected, more uniform distribution of impurities versus ingot-cast silicon was confirmed. As the 0.2 micrometer impurity particle size is substantially finer than the typical 2-8 micrometer weight mean particle size of milled silicon powders, an improvement in mechanical properties related to critical silicide flaw size is obtained. The spacing between silicide localizations was substantially in the range of 1-25 micrometers.

EXAMPLE 2

In this example, the improved uniformity of distribution of the second phase is demonstrated for a case in which a large proportion of an intentional additive was present. 10.1% by weight yttrium was intentionally added to the melt, the percentage being on a silicon alloy basis; this corresponds to a silicon nitride equivalent (after nitriding losses) of 8% by weight $Y_2O_3$ in silicon nitride. Electronic grade silicon (greater than 99.999% purity) was used for the melt and was melted in an $SiO_2$ crucible with yttrium metal (from Cerac/-Pure, Milwaukee, Wisconsin) of 99.9% purity in ratio corresponding to 10.1% yttrium. After a period of convective stirring for intermixing, a rapidly spinning disc was dipped into the surface of the melt to extract a ribbon of rapidly solidified material, solidification rate of about $5 \times 10^{6\circ}$ C./second.

Analysis of the ribbon by X-ray and selected area diffraction showed high temperature yttrium silicide to be present in addition to silicon. Examination in the scanning transmission microscope showed the presence of a continuous grain boundary phase of the yttrium silicide. The typical thickness of this additive phase was 0.2 microns. Also, the grain size was refined (relative to ingot cast material) and was markedly more uniform in size than in the case of Example 1. The grain size was approximately 2 micrometers. The thin film of silicide in the grain boundary is consistent with the uniform distribution of the localization of impurities or metal additives.

A fine distribution of a second phase present in large quantity is thereby shown. After milling, the distribution of the sintering additive as oxide would be expected to assist in uniform liquid phase sintering shrinkage.

EXAMPLE 3

In this sample, the combinatorial practice is demonstrated of the impure material of Example 1 with the large intentional additive of Example 2.

Ingot-cast metallurgical grade silicon in the form of ½ inch by down chunks was melted in an $SiO_2$ crucible with yttrium metal in amounts corresponding to 10.1% by weight yttrium (silicon alloy basis). After stirring, the spinning disc was dipped into the surface of the melt to extract a ribbon of rapidly solidified material.

Examination in the scanning transmission electron microscope found a continuous grain boundary phase of silicide (as in Example 2). Similar to Example 2, the thickness of the continuous grain boundary phase was substantially finer than the typical 2-8 micrometer weight mean grain size of ingot-cast and milled silicon.

Thus, the improved uniformity of additive phase can be achieved with the more economical metallurgical grade silicon.

EXAMPLE 4

In this example, the retention of fine second phase particle size is demonstrated for a thermal treatment at temperatures used for nitriding of silicon to form reaction bonded silicon nitride.

Ribbons of rapdily solidified silicon produced according to Example 1 from metallurgical grade silicon without intentional additives were placed on supporting silicon ribbons in contact with an alumina crucible. A continuously flowing atmosphere of 50% nitrogen and 50% hydrogen was provided by a mixture of ammonia and nitrogen fed into a sealed tubular furnace. The temperature was raised to 1000° C. and held one hour; to 1050° C. and held one hour; to 1100° C. and held one hour; and to 1160° C. and held three hours. The samples were cooled to room temperature in a flowing nitrogen atmosphere.

Examination of the resulting material by scanning transmission electron microscopy revealed that a fine dispersion of silicides in silicon remained. At most, the average silicide had coarsened from 0.2 micrometer to 0.5-1.0 micrometers as a result of solid state treatment to within 50° C. of the impurity eutectic temperature. No coarsening of the silicon grain size was observed.

The stability of the fine dispersion size in this example points to stability of the dispersion over the longer periods of time to allow complete nitriding.

EXAMPLE 5

In this example, estimates are made for the production of rapidly solidified powder by a procedure that is alternative to that of melt extraction used in Examples 1-3. In particular, estimates are made for a rapid solidification process described for large quantity production of metallic superalloys: disc atomization with inert gas quench, following U.S. Pat. No. 4,078,873.

A melt of metallurgical grade silicon was prepared in an amount of 250 kilograms and is heated to 1480° C. and tapped at a temperature of 1450° C. The silicon is disc atomized with a disc of diameter 3 inches rotating at a speed of 24,000 rpm and a tip speed of 96 meters per second. The horizontally sprayed silicon liquid droplets are contacted by helium gas jets directed downwardly and at right angles to the liquid spray, the helium having a temperature of about 80° C., a mass flow rate of 0.91 kilogram per second, and a velocity of about Mach 0.7. Based upon the characteristics of the metalloid liquid and the disc atomizing apparatus, the cooling rate of the liquid was determined to be in the range of $2-6 \times 10^{6\circ}$ C./second.

Analysis of the resulting precursor powder demonstrates that the impurity localizations are uniformly distributed and finely spaced apart a distance substantially in the range of 1-25 microns; no particle was greater than one micron in size. With such fine grained, uniformly distributed second phases, the physical properties of a heat fused article of this powder will be enhanced.

I claim:

1. A method of making a metalloid precursor powder suitable for use in making a silicon nitride comprising body, comprising the steps of:
   (a) melting silicon based material and an oxynitride forming metal added in amounts controlled to form second phase oxynitrides to form a solution; and
   (b) extracting portions of said solution by disk atomization in a manner to rapidly solidify the extracted portions at a rate to distribute the oxynitride forming metal localizations substantially uniformly throughout the extracted portions with spacing beween said localizations being substantially in the range of 1-25 microns and the size of said localizations being on average one micron or less, said solution being comminuted into particles having a size distribution of 2-50 microns.

2. A method of making a metalloid precursor powder with improved chemical uniformity useful in the making of ceramics with greater physical reliability and lower cost, by the steps of:
   (a) dissolving second phase forming additive metals into a molten body of a selected metalloid to form a solution, said additive metals comprising 2-15% by weight yttrium and up to 1.3% by weight aluminum;
   (b) comminuting the solution into particles having a particle size distribution of 2-50 microns and rapidly solidifying the particles at a rate effective to distribute the additive metals and impurity localizations thereof substantially uniformly throughout the particles with spacing betwene said localizations being substantially in the range of 1-25 microns; and (c) oxidizing the additive metals in said particles.

3. The method as in claim 2, in which said metalloid is either germanium or silicon.

4. The method as in claim 2, in which said oxidation is carried out by internal oxidation under a controlled atmosphere anneal.

5. The method as in claim 2, in which said oxidation is carried out to convert said yttrium and aluminum into yttrium oxide and aluminum oxide, both of which are present in an amount to form yttrium silicon oxynitrides during a subsequent nitriding operation.

6. The method as in claim 2, in which said localizations are limited in size to one micron or less.

7. The method as in claim 2, in which said rapid solidification is carried out by impinging a stream of said solution upon a rotating disc to comminute the stream and subjecting the comminuted particles to a high exchange gas.

8. The method as in claim 7, in which said high heat exchange gas is helium.

* * * * *